United States Patent [19]

Olson et al.

[11] Patent Number: 5,273,821

[45] Date of Patent: Dec. 28, 1993

[54] HIGH STRENGTH CERAMIC FIBER BOARD

[75] Inventors: James R. Olson, Youngstown; Mark D. Stahlman, Lewiston, both of N.Y.

[73] Assignee: The Carborundum Company, Niagara Falls, N.Y.

[21] Appl. No.: 790,938

[22] Filed: Nov. 12, 1991

[51] Int. Cl.$^5$ .............................................. D02G 3/00
[52] U.S. Cl. ................................. 428/357; 426/284; 162/145; 162/152
[58] Field of Search ................. 428/357, 384, 379; 501/95; 162/152, 150, 145, 175; 524/47, 52, 53

[56] References Cited

U.S. PATENT DOCUMENTS

| | | | |
|---|---|---|---|
| 3,039,914 | 6/1962 | Reiman | 162/145 |
| 3,077,413 | 2/1963 | Campbell | 501/95 |
| 3,223,580 | 12/1965 | Eckert et al. | 162/145 |
| 3,622,445 | 11/1971 | Heidweiller | 162/145 |
| 3,629,116 | 12/1971 | Gartner et al. | 501/95 |
| 4,212,704 | 7/1980 | Durand et al. | 162/175 |
| 4,247,364 | 1/1981 | Culp | 162/136 |
| 4,267,016 | 5/1981 | Okazaki et al. | 162/146 |
| 4,389,282 | 6/1983 | Yonushonis et al. | 162/145 |
| 4,595,403 | 6/1986 | Sago et al. | 162/152 |
| 4,608,361 | 8/1986 | Kanamori et al. | 264/63 |
| 4,639,390 | 1/1987 | Shaju | 428/195 |
| 4,650,621 | 3/1987 | Sago et al. | 162/152 |
| 4,792,359 | 12/1988 | Barrall et al. | 106/85 |
| 4,806,206 | 2/1989 | Kamijo et al. | 162/150 |
| 4,833,025 | 5/1989 | Rossi | 428/357 |
| 4,950,362 | 8/1990 | Steinau et al. | 162/206 |
| 5,014,396 | 5/1991 | Nieminen | 19/205 |

Primary Examiner—Patrick J. Ryan
Assistant Examiner—N. Edwards
Attorney, Agent, or Firm—Renner, Kenner, Bobak, Taylor and Weber

[57] ABSTRACT

A high strength ceramic fiber board having a green strength of at least 300 psi and a green density of less than about 22 lb/ft$^3$; and having a composition comprising 65-97.5% wt. ceramic fiber, 1-10% wt. PVA fiber, 0.5-10% wt. cationic starch, 0-25% wt. clay filler and 1.0-15% wt. colloidal silica.

9 Claims, No Drawings

HIGH STRENGTH CERAMIC FIBER BOARD

BACKGROUND OF THE INVENTION

This invention relates generally to fiber board and more particularly to a ceramic fiber board having superior green strength at low density.

Ceramic fibers are widely used in the fabrication of blankets, felts and boards for high temperature insulation. Typical applications for fiber boards include, but are not limited to steel splash boards, oven or furnace linings, casting setters or casting tips.

These fiber boards may contain non-crystalline aluminosilicate fibers, crystalline high alumina fibers or a mixture of the two types of fibers. The fibers are usually formed into boards by vacuum casting or other continuous casting methods such as Fourdrinier or rotoformer in which a slurry of fibrous material and various binders and fillers is drained through a screen resulting in a felted pad which is then dried to yield a rigid board.

High strength ceramic fiber boards have a green strength exceeding 300 psi. These boards generally have a green density of at least 22 lb/ft$^3$. In order for conventional high strength fiber boards to be machinable in, for example, sawing, lathe turning, or die cutting operations without significant breakage, tearouts or generation of fiber dust, the green density of the board must be at least 30 lbs/ft$^3$. These higher density boards are generally more costly and more difficult to handle in large pieces without breakage.

Accordingly, it is a primary object of this invention to provide a high strength ceramic fiber board having a density less than 22 lbs/ft$^3$.

It is a further object of this invention to provide a high strength fiber board having a resistance to breakage when handled or machined at a density less than 30 lb/ft$^3$.

SUMMARY OF THE INVENTION

The present invention relates to a high strength ceramic fiber board having a green strength of at least 300 psi and a green density of less than about 22 lbs/ft$^3$; and having a composition comprising 65-97.5% wt. ceramic fiber, 1-10% wt. polyvinyl alcohol (PVA) fiber, 0.5-10% wt. cationic starch, 0-25% wt. clay filler and 1.0-15% wt. colloidal silica.

DETAILED DESCRIPTION OF THE INVENTION

The high strength ceramic fiber boards of the present invention possess superior green strength at lower density than conventional fiber boards. Fiber boards having a green strength of greater than 350 psi as measured by the Modulus of Rupture Test (MOR) at a density of 18 lb/ft$^3$ and fiber boards having a green strength of about 500 psi (MOR) at a density of about 21.5 lb/ft$^3$ were produced. These fiber boards may be used in insulation applications where the temperature reaches about 1260° C.

The present invention is directed to the use of non-crystalline aluminosilicate fibers, crystalline high alumina fibers, or a combination of the two types of fibers. The non-crystalline aluminosilicate fibers are mainly composed of about 40-70% wt. of alumina and 30-60% silica. Both the non-crystalline aluminosilicate and crystalline alumina fibers are commercially available products. The average diameter of the ceramic fibers is about 1-4 microns.

The range of composition of the present invention and the preferred compositions for two specific embodiments of the present invention expressed in weight percent are illustrated by the following table:

TABLE I

| Material | Compositional Range | Composition for 350 psi, 18 lb/ft$^3$ fiber board | Composition for 500 psi, 21.5 lb/ft$^3$ fiber board |
|---|---|---|---|
| Ceramic Fiber | 65.0-97.5 | 90.0 | 79.0 |
| PVA Fiber | 1.0-10.0 | 5.0 | 5.0 |
| Cationic Starch | 0.5-10.0 | 1.5 | 2.0 |
| Clay Filler | 0.0-25.0 | 0.0 | 10.0 |
| Colloidal Silica | 1.0-15.0 | 3.5 | 4.0 |

Preparation

A slurry is formed from an above composition in an aqueous solution of about 1% solids by weight. Following the vacuum forming of a mat from the slurry, the mat is dried in a microwave oven or dielectric oven until substantially all of the water is removed. The mat is then cured in a convection oven at 200° C. to produce a rigid board.

Polyvinyl alcohol (PVA) fiber is used as a binder in the process for preparing the fiber board. PVA fibers are added to the slurry in fiber form and remain in fiber form until the heat in the drying step causes the fiber to dissolve. The PVA fibers dissolve at about 90° C.

The cationic starch which is used as a binder in the present invention may include potato starch and corn starch, among others. Conventional additives known to those in the art, such as clay filler, may be added. For example, bentonite, montmorillonite, ball clay or one of the usual filler clays having some swelling properties in water may be added. Additional binder used in the present invention is colloidal silica in an amount ranging from 1-15% by weight.

The binder system of the present invention is not effective unless either microwave or dielectric drying is used. Convection drying alone will not produce the desired product because the binder migrates after dissolving.

EXAMPLE

A mixture was prepared of 90% wt. non-crystalline aluminosilicate fibers, 5% wt. PVA fibers, 1.5% wt. potato starch and 3.5% wt. colloidal silica. This mixture was added to water to form a slurry containing about 1% solids by weight. The slurry was mixed for about 10 minutes using a medium sheer mixer.

The slurry was then passed through a 40 mesh screen using a vacuum of 15 inches of Hg. The resulting mat was dried in a microwave oven for 20 minutes, followed by curing in a convection oven at 200° C. for 10 minutes. The resulting board had a density of 18 lb/ft$^3$ (MOR) and a flexural strength of about 350 psi. The thickness of the board was about ⅜ inch.

The foregoing example is not intended to limit the subject invention, the breadth of which is defined by the specification and the claims appended hereto, but is presented rather to aid those skilled in the art to clearly understand the invention defined herein.

What we claim is:

1. A high strength ceramic fiber board having a green strength of at least 300 psi and a green density less than about 22 lb/ft$^3$ formed from a composition comprising 65-97.5% wt. ceramic fiber, 1-10% wt. PVA fiber, 0.5-10% wt. cationic starch, 0-25% wt. clay filler and 1.0-15% wt. colloidal silica.

2. A high strength ceramic fiber board as in claim 1 wherein said ceramic fiber is selected from the group consisting of non-crystalline aluminosilicate fibers, crystalline high alumina fibers, and mixtures thereof.

3. A high strength ceramic fiber board as in claim 1 wherein said cationic starch is selected from the group consisting of potato starch and corn starch.

4. A high strength ceramic fiber board as in claim 2 wherein the average diameter of said ceramic fiber is in the range of about 1-4 microns.

5. A high strength ceramic fiber board as in claim 1 wherein the composition comprises about 90% wt. ceramic fiber, about 5% wt. PVA fiber, about 1.5% wt. cationic starch and about 3.5% wt. colloidal silica.

6. A high strength ceramic fiber board as in claim 1 wherein said green strength is about 350 psi and said green density is about 18 lb/ft$^3$.

7. A high strength ceramic fiber board as in claim 1 wherein said green strength is about 500 psi and said green density is about 21.5 lb/ft$^3$.

8. A high strength ceramic fiber board as in claim 1 wherein the composition comprises about 79% wt. ceramic fiber, about 5% wt. PVA fiber, about 2.0% wt. cationic starch, about 10% wt. clay filler and about 4.0% wt. colloidal silica.

9. A high strength ceramic fiber board having a green strength of at least 300 psi and a green density less than about 30 lb/ft$^3$, and wherein said ceramic fiber board is machinable without significant breakage.

* * * * *